(12) United States Patent
Gintis

(10) Patent No.: US 9,094,336 B2
(45) Date of Patent: Jul. 28, 2015

(54) METHODS, SYSTEMS, AND COMPUTER READABLE MEDIA FOR ASSISTING WITH THE DEBUGGING OF CONDITIONS ASSOCIATED WITH THE PROCESSING OF TEST PACKETS BY A DEVICE UNDER TEST

(71) Applicant: Ixia, Calabasas, CA (US)

(72) Inventor: Noah Gintis, Westlake Village, CA (US)

(73) Assignee: IXIA, Calabasas, CA (US)

( * ) Notice: Subject to any disclaimer, the term of this patent is extended or adjusted under 35 U.S.C. 154(b) by 38 days.

(21) Appl. No.: 13/847,477

(22) Filed: Mar. 19, 2013

(65) Prior Publication Data

US 2014/0269347 A1    Sep. 18, 2014

Related U.S. Application Data

(60) Provisional application No. 61/852,227, filed on Mar. 15, 2013.

(51) Int. Cl.
*H04L 12/26* (2006.01)

(52) U.S. Cl.
CPC ............. *H04L 43/50* (2013.01); *H04L 43/0829* (2013.01)

(58) Field of Classification Search
None
See application file for complete search history.

(56) References Cited

U.S. PATENT DOCUMENTS

| | | | |
|---|---|---|---|
| 5,343,463 A | 8/1994 | van Tetering et al. |
| 5,477,531 A | 12/1995 | McKee et al. |
| 5,600,632 A | 2/1997 | Schulman |
| 5,742,760 A | 4/1998 | Picazo, Jr. et al. |
| 5,787,253 A | 7/1998 | McCreery et al. |
| 5,850,386 A | 12/1998 | Anderson et al. |
| 5,878,032 A | 3/1999 | Mirek et al. |
| 5,982,753 A | 11/1999 | Pendleton et al. |
| 6,028,847 A | 2/2000 | Beanland |
| 6,041,053 A | 3/2000 | Douceur et al. |
| 6,065,053 A | 5/2000 | Nouri et al. |
| 6,088,777 A | 7/2000 | Sorber |
| 6,172,989 B1 | 1/2001 | Yanagihara et al. |
| 6,252,891 B1 | 6/2001 | Perches |
| 6,295,557 B1 | 9/2001 | Foss et al. |

(Continued)

FOREIGN PATENT DOCUMENTS

JP    2012-113371 A    6/2012

OTHER PUBLICATIONS

"IXIA 200 Chassis," Product Description, Ixia, p. 1 (Publication Date Unknown).

(Continued)

*Primary Examiner* — Kerri Rose
(74) *Attorney, Agent, or Firm* — Jenkins, Wilson, Taylor & Hunt, P.A.

(57) ABSTRACT

Methods, systems, and computer readable media for assisting with debugging of conditions associated with the processing of test packets by a device under test are disclosed. One method includes transmitting test packets to a device under test. The method further includes receiving at least some of the test packets from the device under test. The method further includes storing information regarding the transmitted packets and the received packets. The method further includes applying rules to the stored information to determine correlations between packet conditions and packet parameters. The method further includes determining at least one cause of the packet condition based on the correlations. The method further includes outputting an indication of the at least one cause of the packet condition.

17 Claims, 14 Drawing Sheets

(56) References Cited

U.S. PATENT DOCUMENTS

| | | |
|---|---|---|
| 6,360,332 B1 | 3/2002 | Weinberg et al. |
| 6,446,121 B1 | 9/2002 | Shah et al. |
| 6,545,979 B1 | 4/2003 | Poulin |
| 6,601,098 B1 | 7/2003 | Case et al. |
| 6,717,917 B1 | 4/2004 | Weissberger et al. |
| 6,728,929 B1 | 4/2004 | Luong |
| 6,789,100 B2 | 9/2004 | Nemirovsky et al. |
| 6,820,034 B2 | 11/2004 | Hanes et al. |
| 6,823,219 B2 | 11/2004 | Lee et al. |
| 6,888,818 B1 | 5/2005 | Gubbi |
| 6,910,061 B2 | 6/2005 | Hu et al. |
| 6,950,405 B2 | 9/2005 | Van Gerrevink |
| 7,007,089 B2 | 2/2006 | Freedman |
| 7,035,223 B1 | 4/2006 | Burchfiel et al. |
| 7,187,683 B1 | 3/2007 | Sandoval et al. |
| 7,406,089 B1 | 7/2008 | Rahim et al. |
| 7,443,870 B2 | 10/2008 | Zioulas et al. |
| 7,489,706 B2 | 2/2009 | Hatley et al. |
| 7,561,559 B2 | 7/2009 | Hannel et al. |
| 7,594,159 B2 | 9/2009 | Fujikami et al. |
| 7,643,431 B2 | 1/2010 | Pepper |
| 7,826,377 B2 | 11/2010 | Pepper |
| 7,826,381 B1 | 11/2010 | Kastuar et al. |
| 8,248,926 B2 | 8/2012 | Bockwoldt et al. |
| 8,310,942 B2 | 11/2012 | Gintis et al. |
| 8,391,157 B2 | 3/2013 | Ginsberg et al. |
| 8,582,466 B2 | 11/2013 | Gintis et al. |
| 2001/0016867 A1 | 8/2001 | Hu et al. |
| 2002/0183969 A1 | 12/2002 | Hanes et al. |
| 2003/0033025 A1 | 2/2003 | Lee et al. |
| 2004/0052259 A1 | 3/2004 | Garcia et al. |
| 2004/0252686 A1 | 12/2004 | Hooper et al. |
| 2005/0068891 A1 | 3/2005 | Arsikere et al. |
| 2005/0086336 A1* | 4/2005 | Haber .................. 709/223 |
| 2005/0286564 A1 | 12/2005 | Hatley et al. |
| 2006/0088060 A1 | 4/2006 | Fujikami et al. |
| 2006/0153078 A1 | 7/2006 | Yasui |
| 2007/0115833 A1 | 5/2007 | Pepper et al. |
| 2007/0291654 A1 | 12/2007 | Pepper |
| 2008/0112332 A1 | 5/2008 | Pepper |
| 2008/0181123 A1* | 7/2008 | Huang et al. .................. 370/252 |
| 2008/0198754 A1 | 8/2008 | Savoor et al. |
| 2009/0147671 A1* | 6/2009 | Jaworski et al. .............. 370/216 |
| 2009/0161559 A1 | 6/2009 | Bielig et al. |
| 2009/0175180 A1* | 7/2009 | Yang et al. .................... 370/252 |
| 2009/0310491 A1 | 12/2009 | Ginsberg et al. |
| 2010/0036939 A1* | 2/2010 | Yang et al. .................... 709/224 |
| 2010/0095160 A1* | 4/2010 | Dickens et al. ................. 714/43 |
| 2011/0069620 A1 | 3/2011 | Gintis et al. |
| 2011/0069626 A1 | 3/2011 | Sun et al. |
| 2011/0279138 A1 | 11/2011 | Mutnury et al. |
| 2012/0051234 A1 | 3/2012 | Gintis et al. |
| 2013/0064125 A1 | 3/2013 | Gintis et al. |
| 2013/0111535 A1* | 5/2013 | Howe et al. .................. 725/109 |
| 2013/0329572 A1 | 12/2013 | Gintis |
| 2014/0269337 A1 | 9/2014 | Gintis |

OTHER PUBLICATIONS

Non-Final Office Action for U.S. Appl. No. 13/832,137 (Nov. 3, 2014).

Notification of Transmittal of the International Search Report and the Written Opinion of the International Searching Authority, or the Declaration for International Application No. PCT/US2014/019690 (Jun. 17, 2014).

Notice of Allowance and Fee(s) Due for U.S. Appl. No. 13/672,335 (Sep. 12, 2013).

Notice of Allowance and Fee(s) Due for U.S. Appl. No. 12/870,729 (Aug. 31, 2012).

Non-Final Office Action for U.S. Appl. No. 12/870,729 (Jul. 2, 2012).

Extended European Search Report for European Application No. 11008066,0 (Feb. 10, 2012).

Torrents, "Open Source Traffic Analyzer," KTH Information and Communication Technology (2010).

Sadasivan et al., "Architecture for IP Flow Information Export," Network Working Group, RFC 5470, pp. 1-31 (Mar. 2009).

"Border Gateway Protocol (BGP) Conformance and Performance Testing Sample Test Plans," IXIA (2004).

"IxExplorer User's Guide," Revision 2.1.0, Ixia, pp. 1-384 (Nov. 1, 1999).

Brownlee et al., "Traffic Flow Measurement: Architecture," Network Working Group, RFC 2722, pp. 1-49 (Oct. 1999).

"The Ixia 200 Traffic Generator and Analyzer," Product Description, Ixia, pp. 1-2 (Copyright 1997-1999).

"Load Modules—Multilayer Gigabit Ethernet for LM1000LX, LM1000SX, LM1000GBIC, & LM1000T," Product Specification Sheet, Ixia, pp. 1-2 (Publication Date Unknown).

* cited by examiner

FIG. 3K

METHODS, SYSTEMS, AND COMPUTER READABLE MEDIA FOR ASSISTING WITH THE DEBUGGING OF CONDITIONS ASSOCIATED WITH THE PROCESSING OF TEST PACKETS BY A DEVICE UNDER TEST

PRIORITY CLAIM

This application claims the benefit of U.S. Provisional Patent Application Ser. No. 61/852,227 titled "METHODS, SYSTEMS, AND COMPUTER READABLE MEDIA FOR ASSISTING WITH THE DEBUGGING OF CONDITIONS ASSOCIATED WITH THE PROCESSING OF TEST PACKETS BY A DEVICE UNDER TEST," filed Mar. 15, 2013 the disclosure of which is incorporated herein by reference in its entirety.

TECHNICAL FIELD

The subject matter described herein relates to testing network conditions. More particularly, the subject matter described includes methods, systems, and computer readable media for assisting with the debugging of conditions associated with the processing of test packets by a device under test.

BACKGROUND

Network test devices test the functionality of network devices, such as routers, switches, firewalls, and network address translators, by sending test packets to the network devices and monitoring the responses. For example, in order to test whether the routing tables of a router are properly configured, a network test device may generate packets, send the packets to the router, and monitor one or more output ports of the router to determine whether the packets are routed to the proper destinations. In a load testing scenario, the network test device may send packets to the router at a high data rate to see how the router's performance is affected by increased traffic loads.

In these and other test scenarios, it is desirable for the network test device to determine the cause of packet conditions. For example, if packets are lost, misdirected, or delayed, it is desirable to identify the causes of packet loss, misdirection, or delay. In another example, it may be desirable to identify possible causes of jitter in packet arrival times. Currently, causes of packet conditions can be manually identified through analysis of packet capture data by the network administrator. However, due to the volume of packet capture data required to be analyzed, such manual analysis is impractical. Accordingly, there exists a need for methods, systems, and computer readable media for assisting with the debugging of packet conditions associated with the processing of test packets by a device under test.

SUMMARY

Methods, systems, and computer readable media for assisting with debugging of conditions associated with the processing of test packets by a device under test are disclosed. One method includes transmitting test packets to a device under test. The method further includes receiving at least some of the test packets from the device under test. The method further includes storing information regarding the transmitted packets and the received packets. The method further includes applying rules to the stored information to determine correlations between packet conditions and packet parameters. The method further includes determining at least one cause of the packet condition based on the correlations. The method further includes outputting an indication of the at least one cause of the packet condition.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

The subject matter described herein will now be explained with reference to the accompanying drawings of which:

FIGS. 3A-3L are computer screen shots of an exemplary graphical user interface that may be produces by a packet condition debug assistant according to an embodiment of the subject matter described herein.

DETAILED DESCRIPTION

Figure 1:
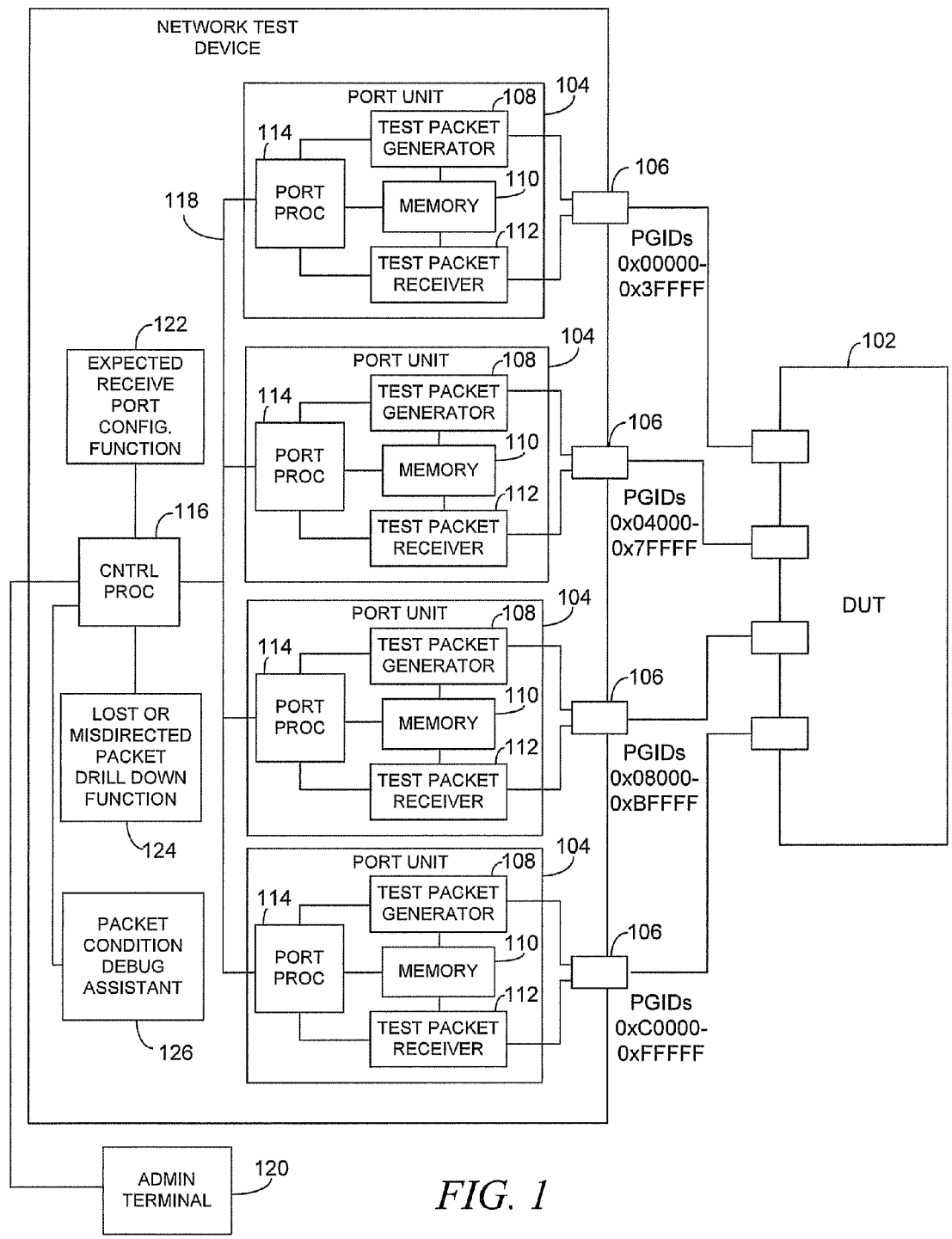
FIG. 1 is a block diagram of an exemplary system for assisting with the debugging of conditions associated with the processing of test packets transmitted by a device under test according to an embodiment of the subject matter described herein.

The subject matter described herein includes methods, systems, and computer readable media for assisting with the debugging of conditions associated with the processing of test packets by a device under test. FIG. 1 is a block diagram of an exemplary system for assisting with the debugging of conditions associated with the processing of test packets by a device under test according to an embodiment of the subject matter described herein. Referring to FIG. 1, the system includes a network test device 100 configured to generate test packets and transmit the test packets to a device under test 102. Device under test 102 may be any suitable network device that receives and processes or forwards packets. For example, device under test 102 may be a router, a switch, a firewall, or a network address translator.

In the illustrated example, network test device 100 includes a plurality of port units 104 that transmit packets to device under test 102 and receive packets from device under test 102 via ports 106. Each port unit 104 may be implemented as all or part of a printed circuit board mounted in a chassis. In the illustrated example, each port unit 104 includes a test packet generator 108, memory 110, a test packet receiver 112, and a port processor 114. Test packet generator 108 of each port unit generates test packets to be transmitted to device under test 102. Test packet receiver 112 receives packets from device under test 102 and generates statistics for the received packets. Memory 110 stores both configuration information for test packet generator 108 and test packet receiver 112 and also stores the generated statistics and any other information needed or collected by port unit 104. Port processor 114 controls the overall operation of each port unit 104. In addition, each port processor 114 may communicate with a control processor 116 over a backplane 118. Control processor 116 may control the overall operation of network test device 100. Control processor 116 may also control communications between admin terminal 120 and port processors 114. Admin terminal 120 may be a general purpose computer through which a test system operator configures network test device 100 and views output generated by network test device 100.

Network test device 100 further includes an expected receive port configuration function 122 and a lost or misdirected packet drill down function 124. Expected receive port configuration function 122 may perform operations that enable a user to configure each port unit 108 with information regarding the expected receive port for each transmitted packet. In one exemplary implementation, expected receive port configuration function 122 allows the user to configure, for each port unit, packet group identifier values (PGIDs) to be inserted in each packet and PGIDs that are expected to be received by each port unit 104. A PGID is an identifier for a packet group. The packet group is any plurality of packets for which network statistics are generated. In one implementation, the PGID is a 20-bit value stored in the packet payload. However, any number of bits that correspond to addresses and available memory space of port units 104 may be used without departing from the scope of the subject matter described herein.

In one exemplary implementation, each port unit 104 may support 20-bit PGID values. That is, in hexadecimal, the complete range of PGID values supported by port units 104 is 0x00000-0xFFFFF. In a simplified example, it can be assumed that ranges of PGID values are divided equally between port units 104. In such an example, a first port unit 104 may support PGIDs ranging from 0x00000-0x3FFFF. A second port unit 104 may support PGID values 0x40000-0x7FFFF. A third port unit 104 may support PGID values 0x80000-0xBFFFF. A fourth port unit 104 may support PGID values ranging from 0xC0000-0xFFFFF. These ranges are illustrated in FIG. 1.

Although ranges of PGID values are assigned to each port unit 104 in the example illustrated in FIG. 1, it is understood that more complex PGID assignment schemes may be implemented without departing from the scope of the subject matter described herein. For example, for multicast packets, the same PGID values may be assigned to multiple ports—i.e., to each port on which the multicast packets are expected to be received. Thus, port units 104 may be assigned overlapping PGID values and PGID values that do not correspond to sequential ranges.

Thus, when a packet is transmitted by one of port units 104 to device under test 102, the device may be returned by device under test 102 to the same port 106, to a different port 106 from which the packet was transmitted, or the packet may be lost. If the test packet is received by network test device 100, upon receipt of the test packet, test packet receiver 112 will compare the PGID value in the packet to the range of PGID values associated with its respective port. If the PGID value is in range, test packet receiver 112 will classify the packet as a correctly received packet. If the PGID value is out of range, test packet receiver 112 will classify the packet as a misdirected packet.

In the example illustrated in FIG. 1, lost or misdirected drill down function 124 determines and displays information for each misdirected packet, in addition to the fact that a misdirected packet was received at a particular port. For example, for each misdirected packet, test packet receiver 112 may store the packet in memory 110. Lost or misdirected packet drill down function 124 may periodically retrieve misdirected packets from memories 110. For each misdirected packet, lost or misdirected packet drill down function 124 may display the port on which the packet was received and also the port on which the misdirected packet should have been received. This information will allow the test system operator to see what should have happened during a test.

In addition to identifying misdirected packets, lost or misdirected packet drill down function 124 identifies lost packets and displays lost packets to the user via a capture interface. A capture interface is a graphical interface that displays information regarding received or captured packets to a user. Examples of packet fields that may be displayed in the packet capture interface will be provided below. However, rather than displaying these fields for received or captured packets, lost or misdirected packet drill down function may display these fields for lost packets.

To identify lost packets, lost or misdirected packet drill down function 124 may keep a record of each packet transmitted by each test packet generator 108 in a given test. Such records may be kept in memory 110 resident on each port unit 104 or in a memory separate from port units 104 and accessible by lost or misdirected packet drill down function 124. Lost or misdirected packet drill down function 124 may periodically access memories 110 to determine which test packets have been received. For each received test packet, lost or misdirected packet drill down function 124 may mark the corresponding entry in memory to indicate that the test packet has been received. Lost or misdirected packet drill down function 124 may maintain a timer for each entry. If the timer expires before a transmitted test packet is received, the packet may be identified as a lost packet. In an alternate implementation, lost or misdirected packet drill down function 124 may detect lost packets without using timers. For example, lost or misdirected drill down function 124 may identify lost packets using sequence number errors. If the sequence number in a given received packet or in an acknowledgement of a transmitted packet is not equal to the next expected sequence number, a lost packet may be indicated. Lost packets may be presented to the user by a capture interface on admin terminal 124, which will be described in more detail below.

The system illustrated in FIG. 1 may further include a packet condition debug assistant 126 for applying rules 128 to the information stored by each port unit 204 to determine correlations between packet conditions and packet parameters, to determine a most likely cause of the packet condition based on the correlations, and to output an indication of the most likely cause of the packet condition. Rules 128 may be determined based on experience learned by technicians in the field regarding causes of packet loss, packet latency, packet misdirection, packet jitter and other packet conditions. One rule may be based on the payload size of lost packets. If all or a large percentage of lost packets have the same packet payload size and the packet payload size varies for a given test, the rule may indicate a high correlation between packet payload size and packet loss. Another exemplary rule may be based on the source or destination port associated with packets. For example, such a rule may indicate that if a large percentage of lost packets originate from or are expected to be received by a particular port of network test device 100, then the rule may indicate a misconfigured routing table or cable problem associated with the corresponding port on device under test 102.

Although the preceding two rule examples are based on packet payload size and source or destination port, the subject matter described herein is not limited to rules that are based on packet payload size or port. The subject matter described herein may utilize rules based on a packet parameter or combination of packet parameters to determine correlations between packet conditions and possible causes of the packet conditions. Further, packet condition debug assistant 126 may utilize any suitable statistical technique to determine the correlations between the packet parameters and the possible causes of the packet conditions. In one example, packet condition debug assistant 126 may perform linear regression analysis on packet parameters and possible causes of packet conditions.

Figure 2:
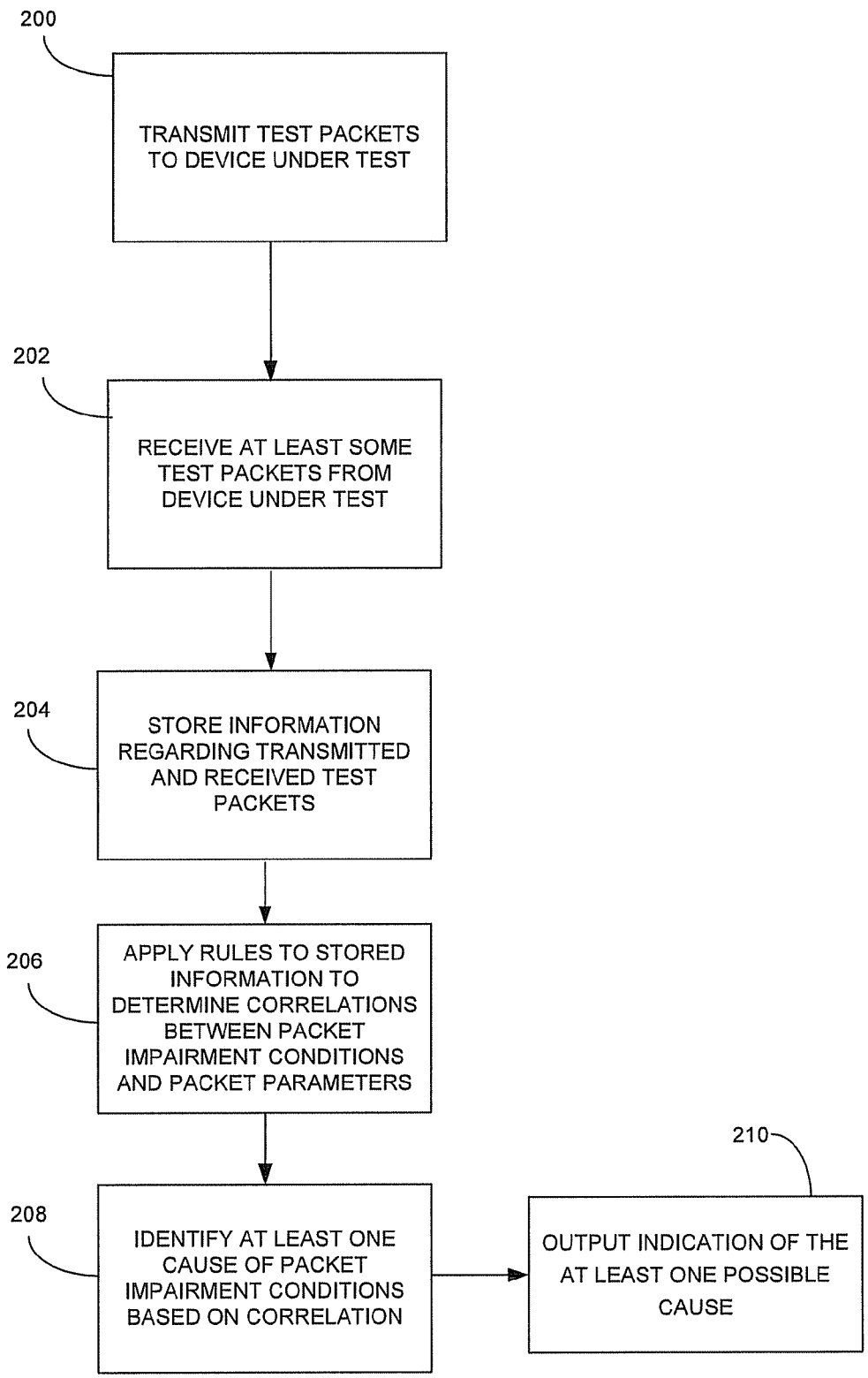
FIG. 2 is a flow chart of an exemplary process for assisting with the debugging packet conditions associated with the processing of test packets by a device under test according to an embodiment of the subject matter described herein.

FIG. 2 is a flow chart illustrating an exemplary process for misdirected packet drill down and negative packet capture at a device under test according to an embodiment of the subject matter described herein. Referring to FIG. 2, in step 200, test packets are transmitted to a device under test. For example, network test device 100 may generate and send test packets to device under test 102. In step 202, at least some of the test packets are received from the device under test. For example, to the extent that device under test 102 is properly configured, test packets will be sent back to network test device 100. Some of the transmitted test packet may be lost, delayed, or misdirected. In step 204, information regarding the transmitted packets and the received packets is stored. For example, packet statistics may be collected for packet groups. The packet statistics may include the timestamp of packet receipt, the timestamp of packet transmission, PGID, source port, actual destination port, expected destination port, source address information, destination address information, payload size, payload protocol, etc. Lost packets may be identified and statistics for lost packets that may be stored include the same statistics for captured packets except for actual destination port and timestamp of packet receipt. In step 206, rules are applied to the stored information to determine correlations between packet conditions and packet parameters. For example, regression analysis may be performed on the packet statistics may be performed to determine correlations between packet statistics and packet conditions. In one example, it may be determined that all lost packets had an expected destination port of 1 on network test device 100. In another example, it may be determined that all or a large percentage of packets that were delayed had a packet payload size greater than 1500 bytes. In step 208, at least one cause of the packet condition is determined on the correlations. Continuing with the preceding two examples, based on the high correlation between the destination port and the lost packets, packet condition assistant 126 may determine that the destination port 1, the corresponding port on device under test 102 or cabling therebetween is the likely cause of packet loss. In the second example, based on the high correlation between packet payload size and packet latency, packet condition assistant 126 may determine that packet payload size is the likely cause of patent latency. In step 210, an indication of the at least one cause of the condition is output. For example, packet condition debug assistant 126 may output to the test administrator via admin terminal 120 the likely cause of packet loss or delay. In the first example, packet condition assistant 126 may output to the administrator an indication of a problem with port 1 or its corresponding port on device under test 102. In the second example, packet condition debug assistant 126 may output an indication that packets having a payload size over 256 bytes are 90% likely to be delayed versus packets with smaller payload sizes.

Figure 3A:
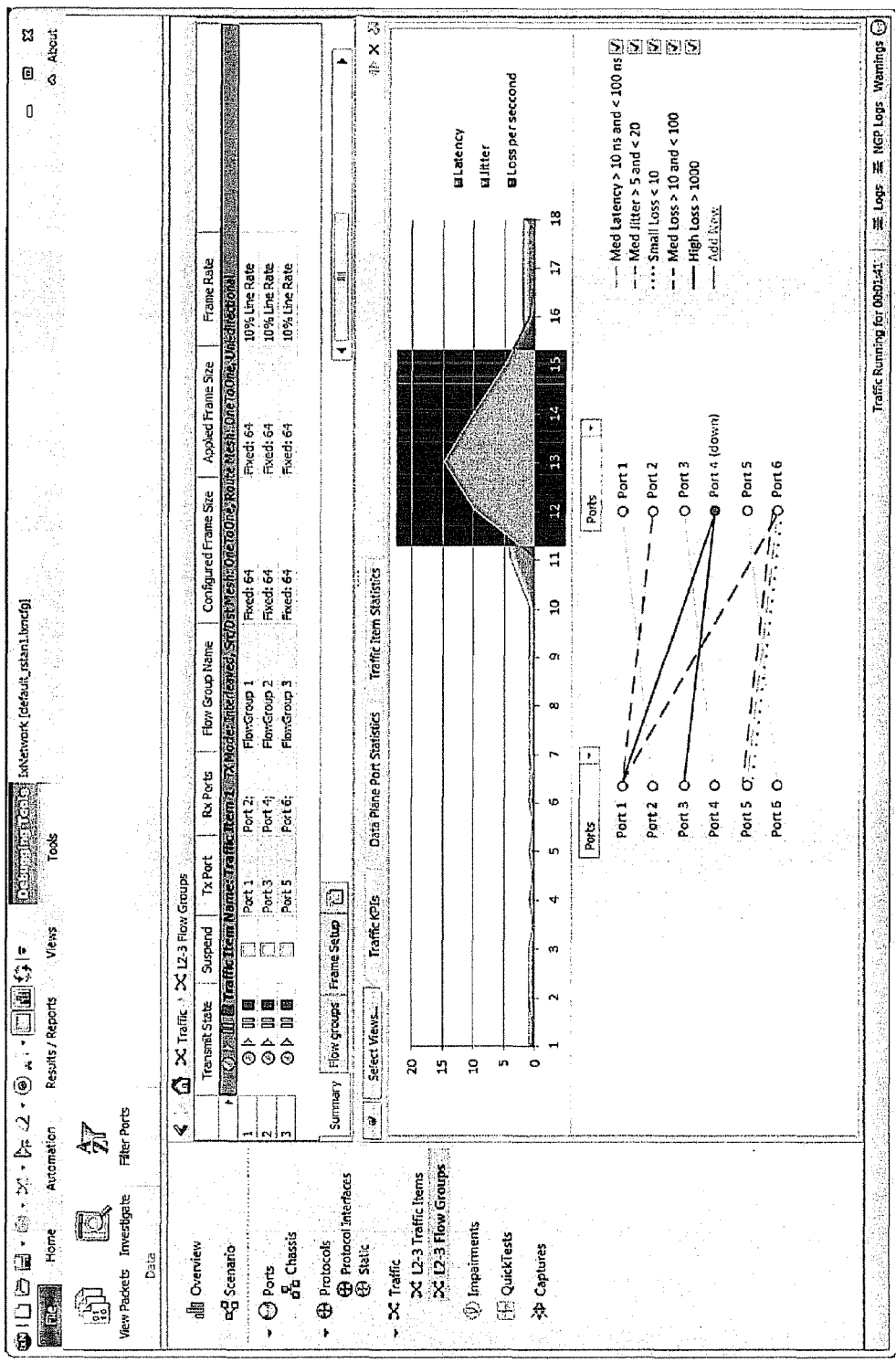
Figure 3B:
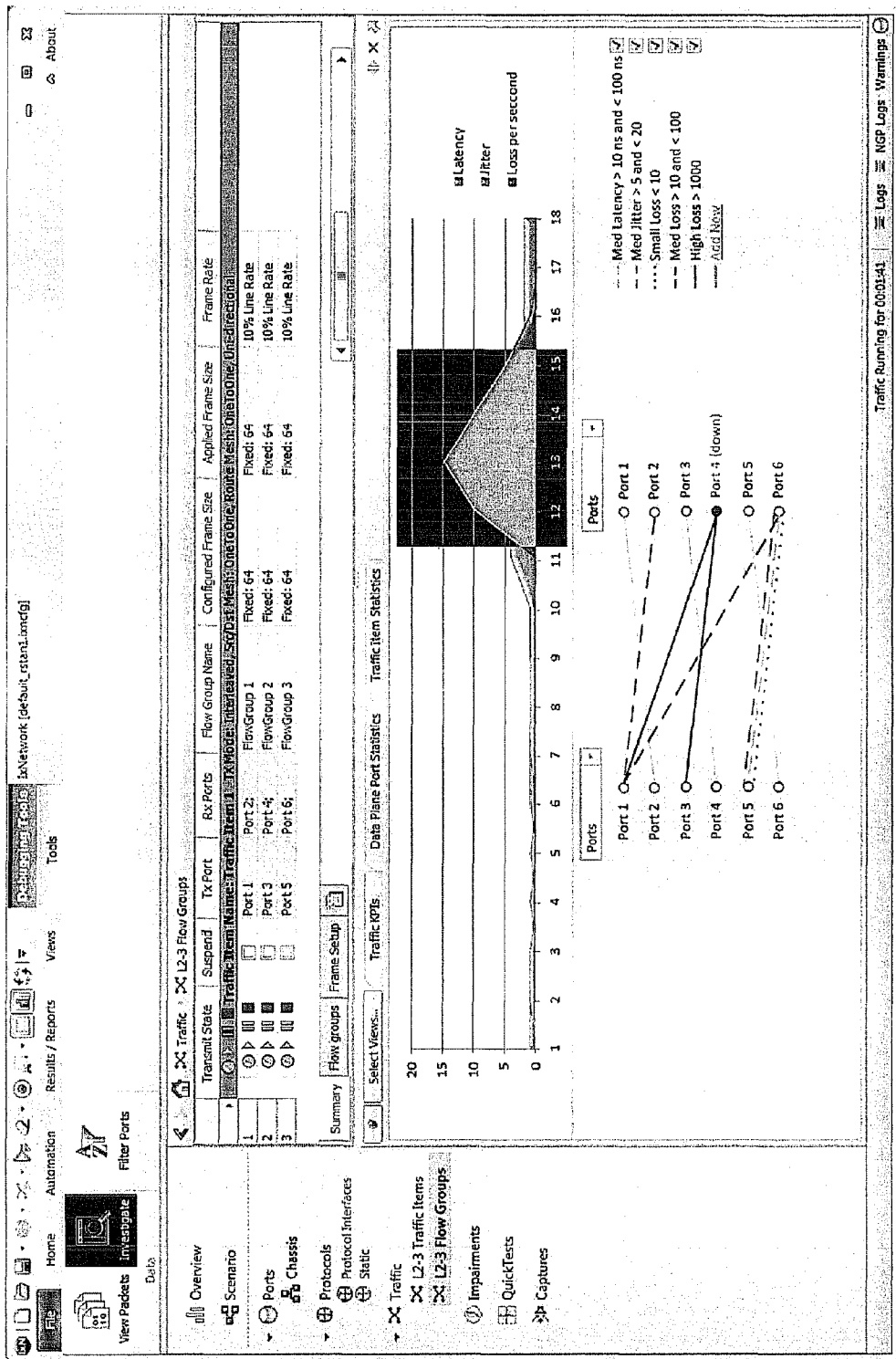
Figure 3C:
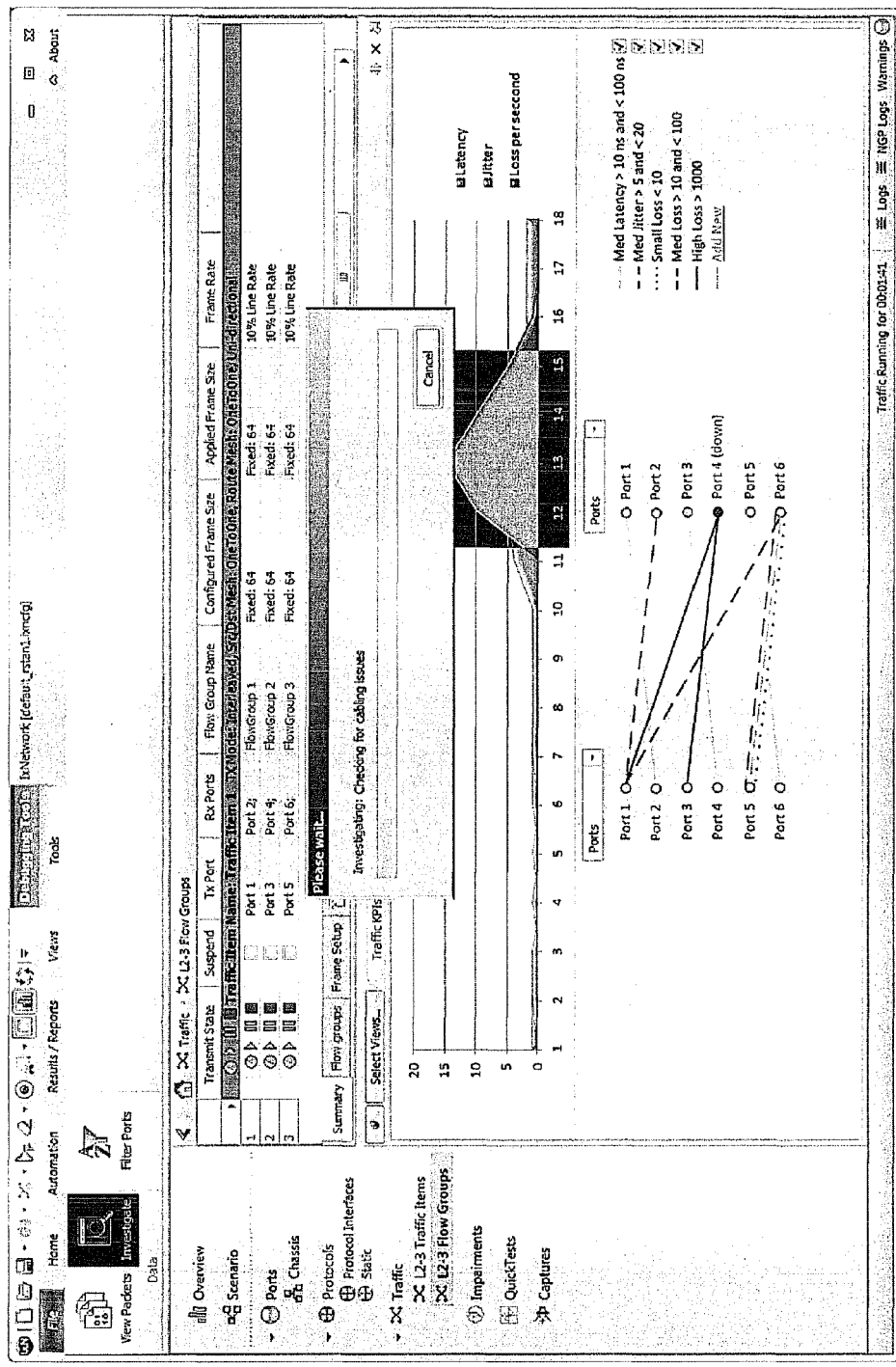
Figure 3D:
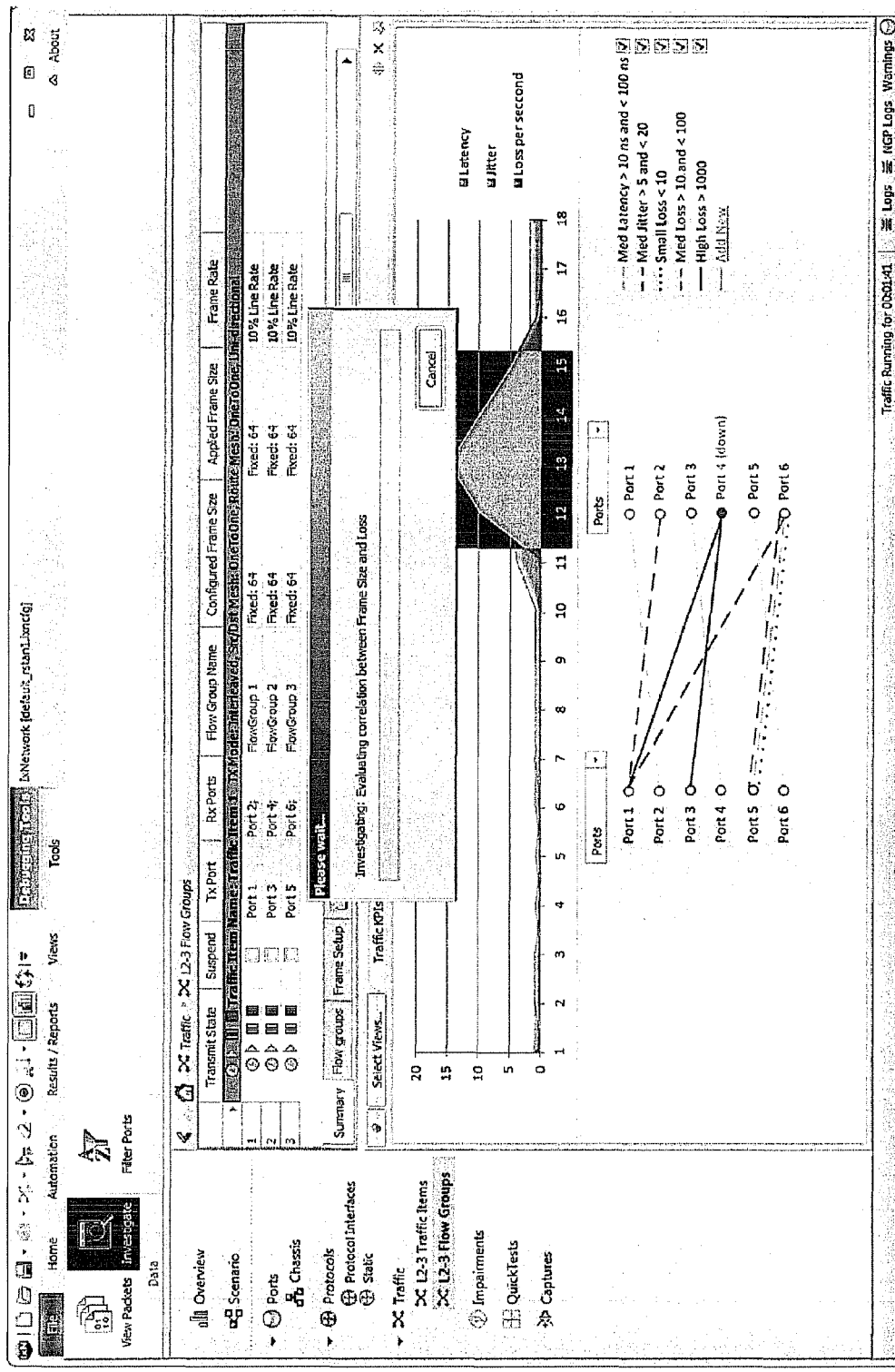
Figure 3E:
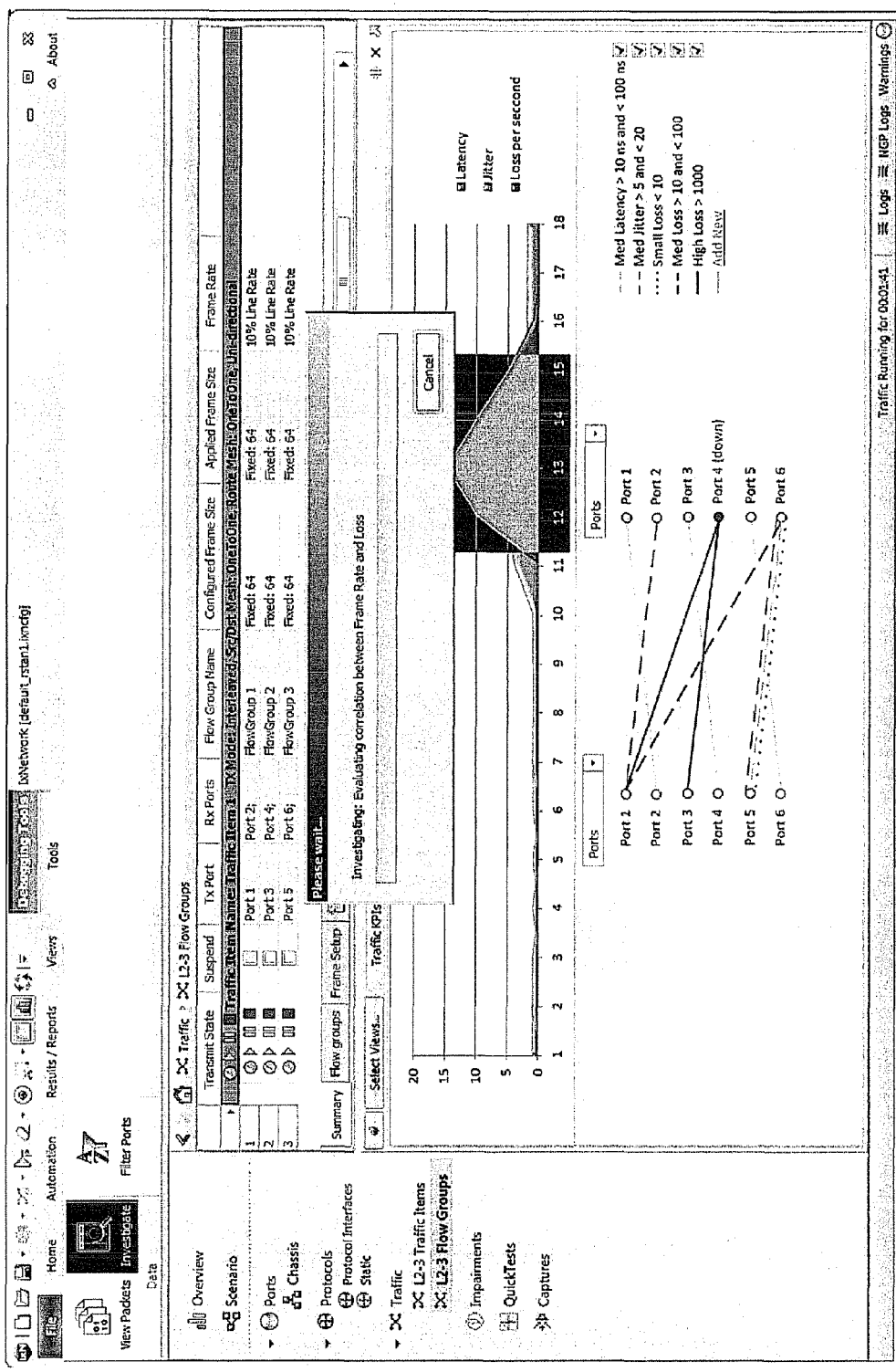

FIGS. 3A-3L are computer screen shots that may be presented by packet condition debug assistant 126. Referring to FIG. 3A, the screen shot includes a graph of packet latency, jitter, and loss rate. The interface allows the user to select regions of the graph and displays below the graph ports of network test device 100, ports of device under test 102, and graphical connections between the ports that correspond to the packet condition selected in the graph. For example, the solid line between port 1 and port 4 indicates >1000 packets lost per second between port 1 and port 4. In FIG. 3B, the interface provides an investigate button that allows the use to select a region of the graph and select the investigate button cause packet condition debug assistant 126 to apply rules 128 to determine possible causes for the selected data. In FIG. 3C, the interface displays a dialog box indicating that packet condition debug assistant 126 is checking for cabling issues. In FIG. 3D, the dialog box indicates that packet condition debug assistant 126 is checking for correlation between frame size and packet loss. In FIG. 3E, the dialog box indicates that packet condition debug assistant 126 is checking for correlation between frame rate and packet loss.

Figure 3F:
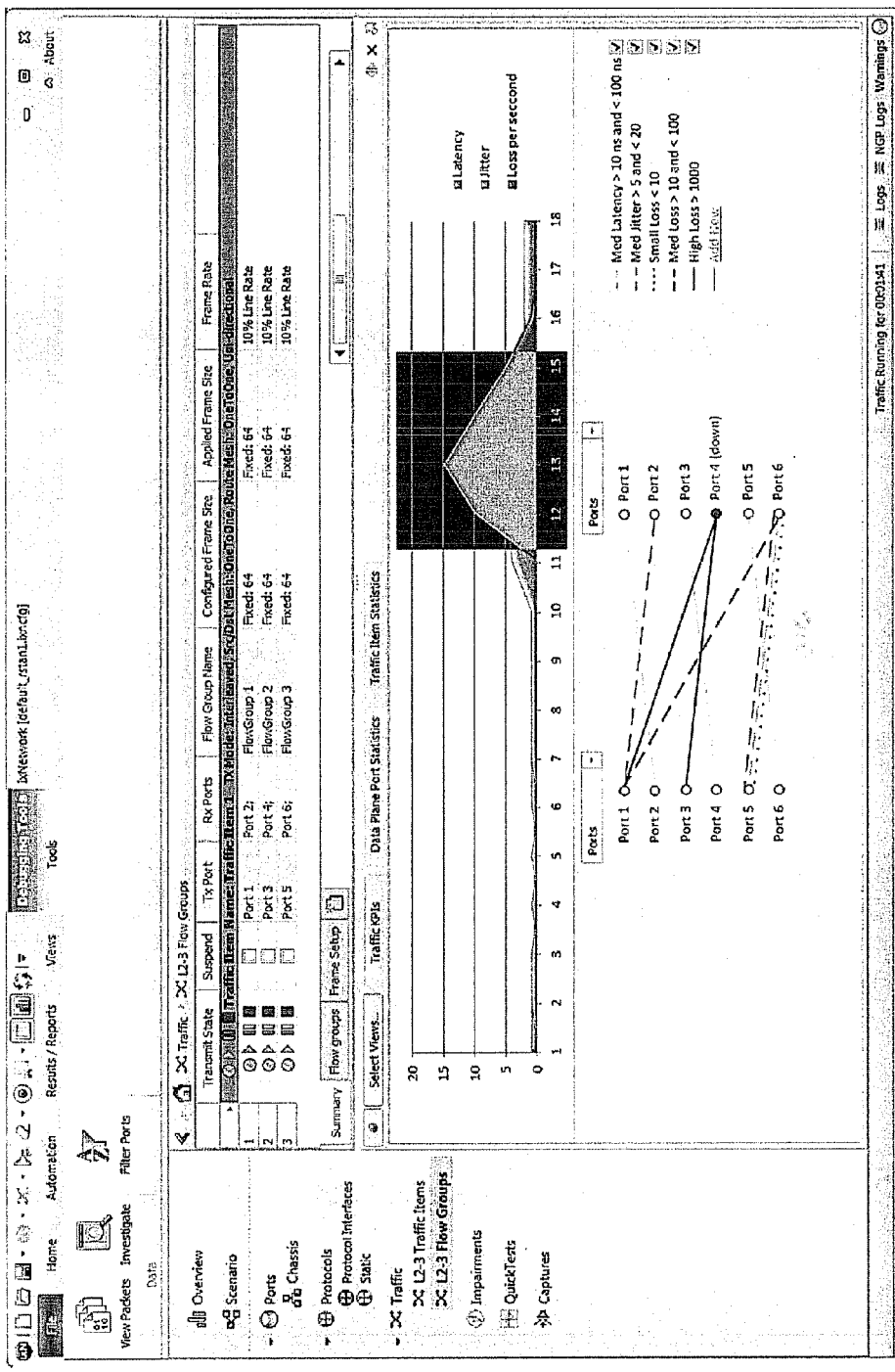
Figure 3G:
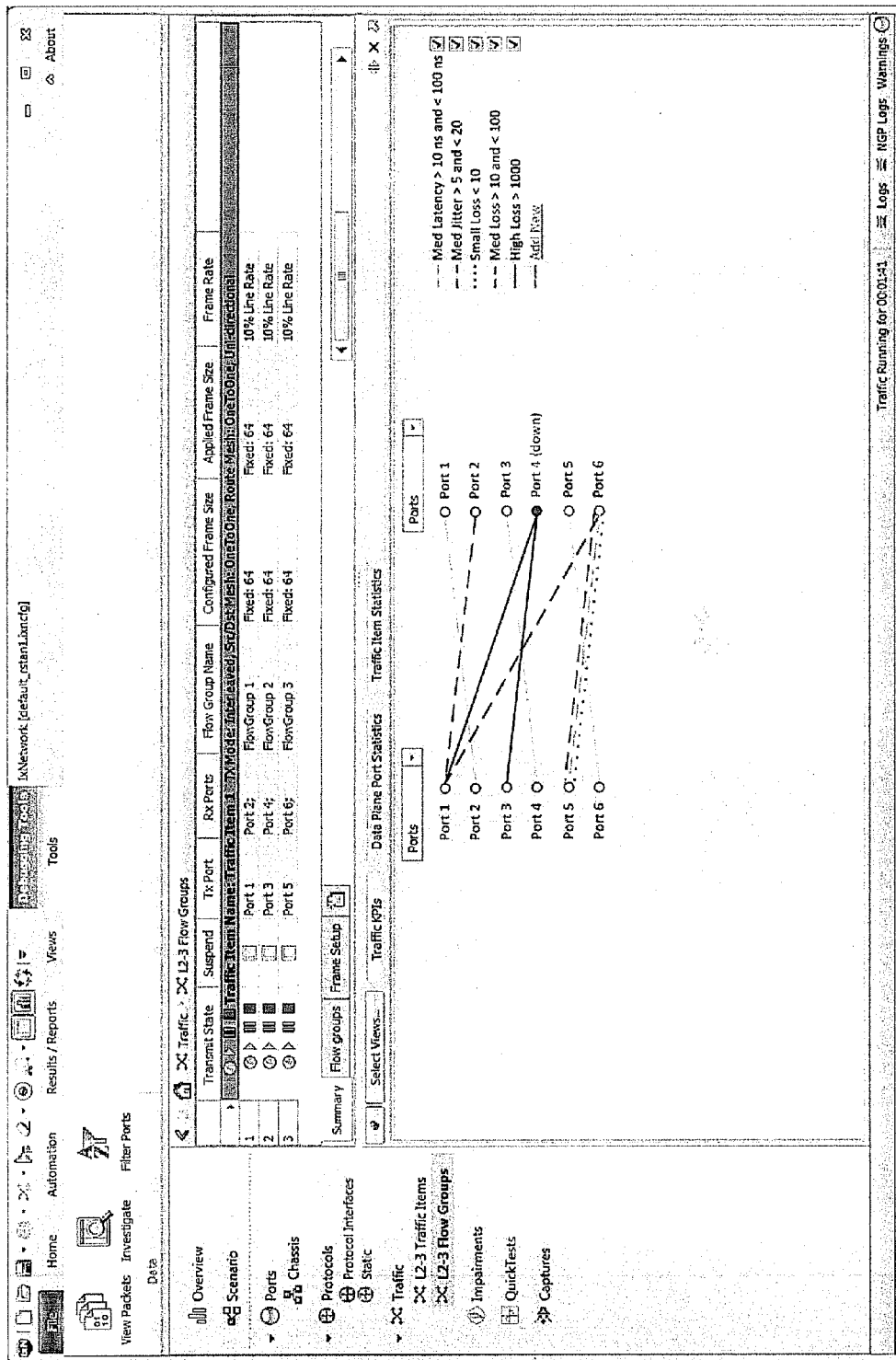
Figure 3H:
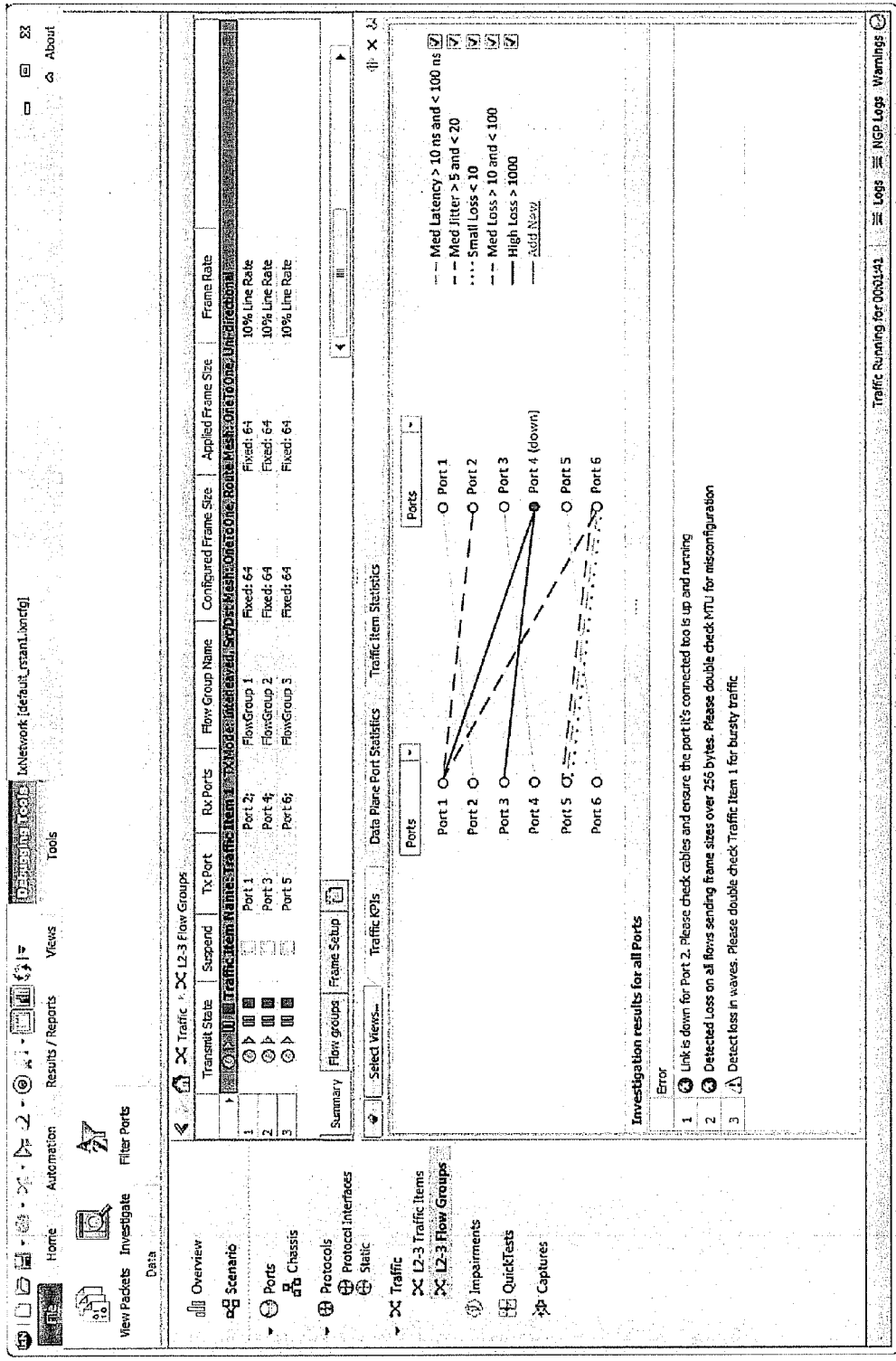

FIGS. 3F and 3G show the timer waiting while packet condition debug assistant 126 applies rules 128, determines correlations between the packet condition and packet parameters, and determines possible causes. In FIG. 3H, packet condition debug assistant outputs three possible causes of packet loss, the first indicating that the link is down for port 2, the second indicating loss for all packets having a frame size greater than 256 bytes, and the third indicating packet bursts as a possible cause for packet loss.

Figure 3I:
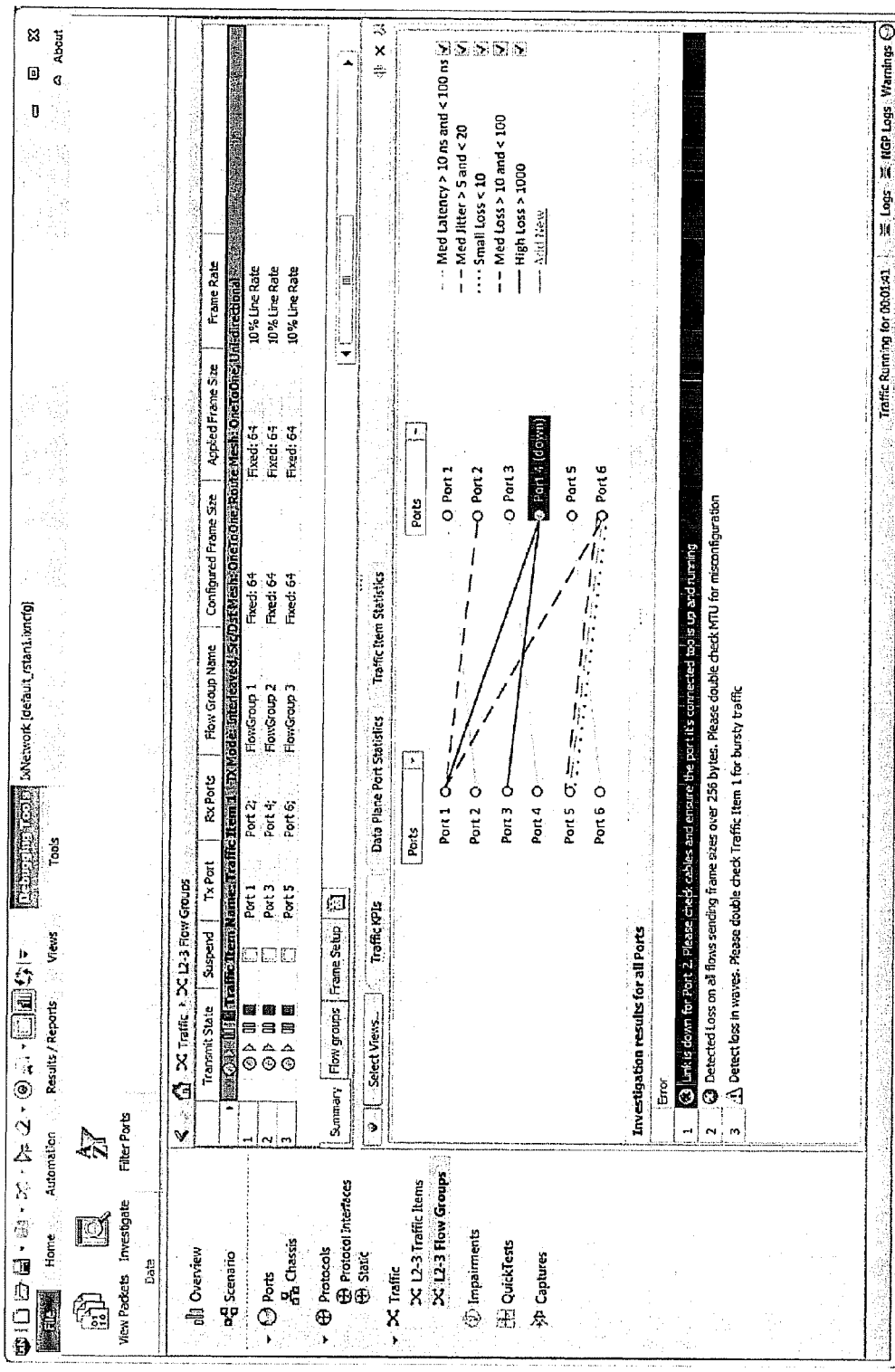
Figure 3J:
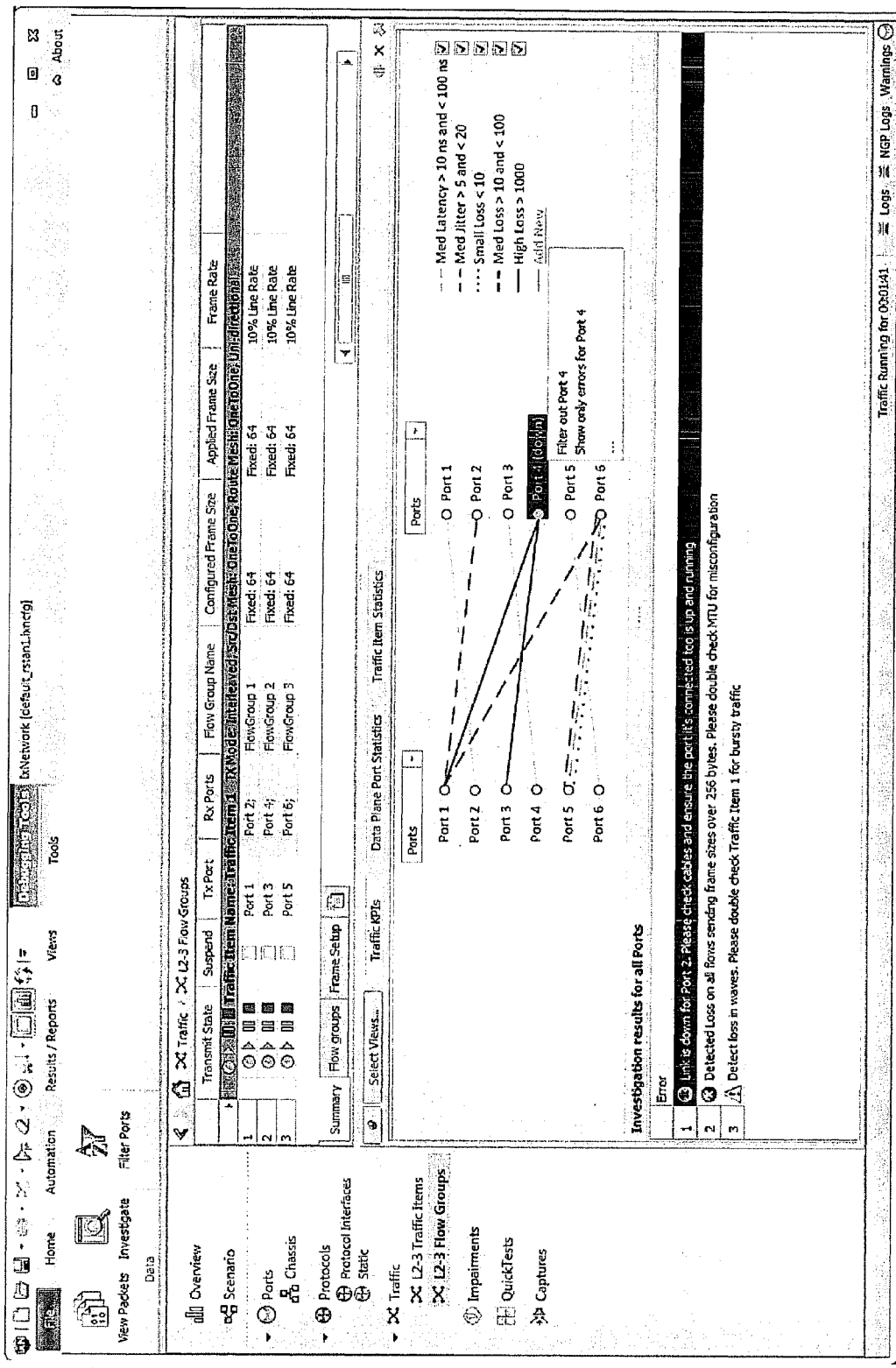
Figure 3K:
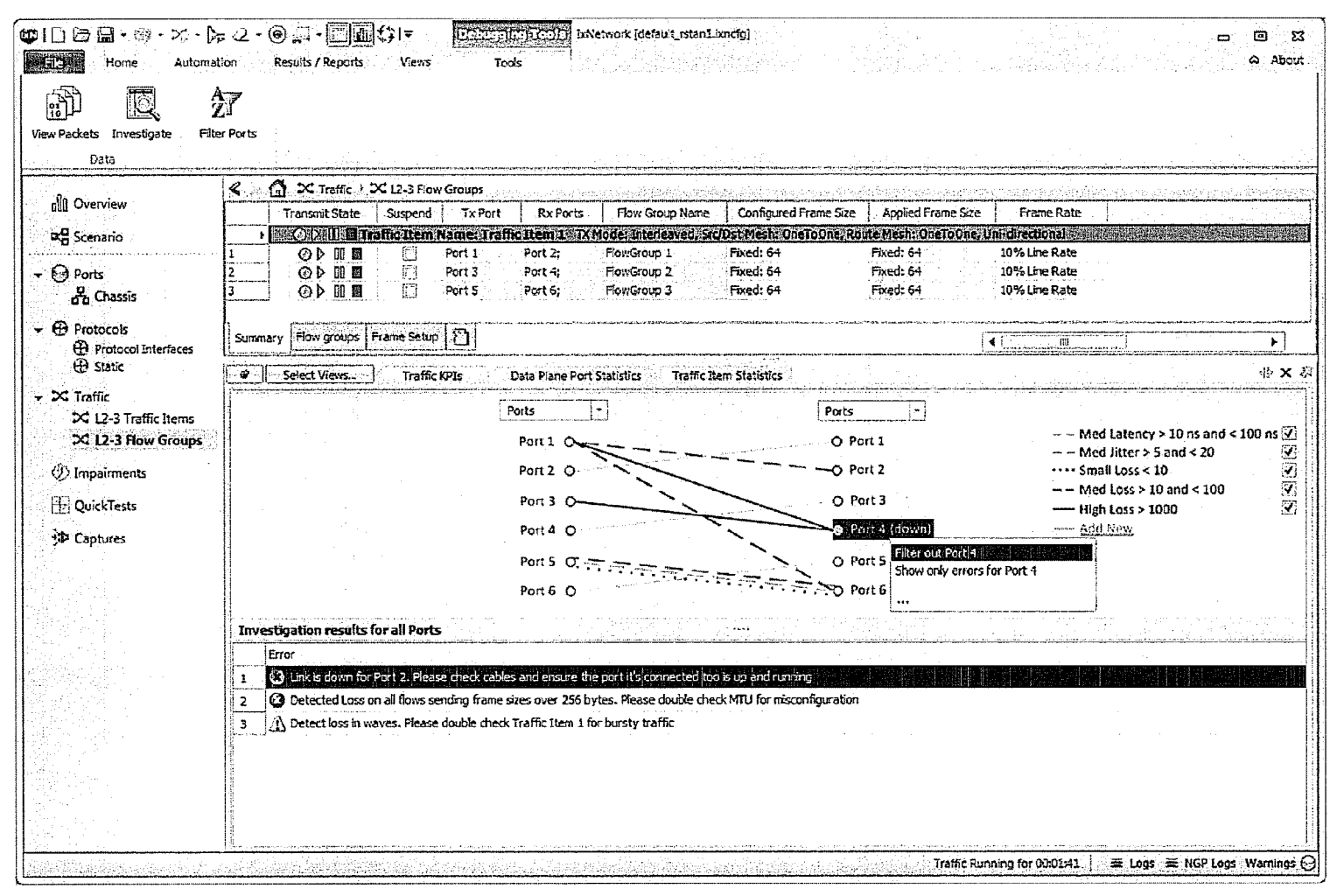
Figure 3L:
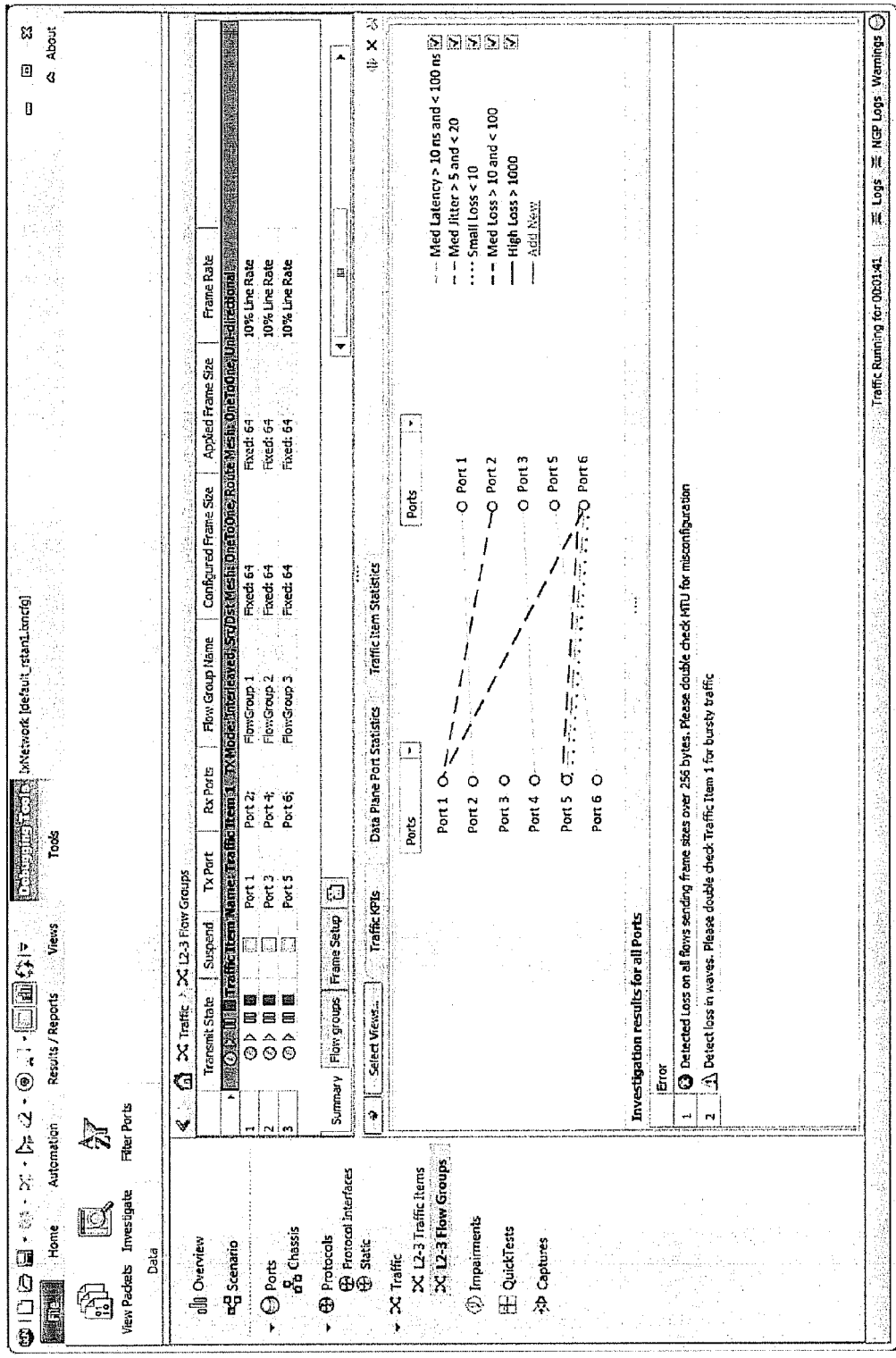

In FIG. 3I, the test administrator selects the first cause, link down on port 2. This selection highlights port 4 on the device under test and produces a menu, illustrated in FIG. 3J, which allows the user to select to either filter out port 4 or to show only errors on port 4. In FIG. 3K, the user selects to filter out port 4. FIG. 3L shows packet loss resulting from filtering out the results for port 4.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for assisting with debugging of conditions associated with the processing of test packets by a device under test, the method comprising:
   in a network test device:
      transmitting test packets to a device under test;
      receiving at least some of the test packets from the device under test;
      storing information regarding the transmitted packets and the received packets;
      providing, by the network test device, a graphical user interface that displays a graph of a packet condition;
      providing, by the network test device, a button in the graphical user interface for triggering investigation of at least one cause of the packet condition, and, in response to actuation of the button:
         automatically applying rules to the stored information to determine correlations between packet conditions and packet parameters;
         automatically determining at least one cause of the packet condition based on the correlations; and
         automatically outputting an indication of the at least one cause of the packet condition.

2. The method of claim 1 wherein applying rules to the stored information includes determining whether the packet condition is associated with a specific port of the device under test.

3. The method of claim 1 wherein applying rules to the stored information includes determining whether the packet condition is associated with a particular packet payload size.

4. The method of claim 1 wherein the packet condition includes packet loss.

5. The method of claim 1 wherein the packet condition comprises packet latency.

6. The method of claim 1 wherein applying rules to the stored information includes applying a plurality of rules to the stored information and determining a correlation between the packet parameters associated with each rule and the packet condition.

7. The method of claim 6 wherein determining at least one possible cause for the packet conditions includes identifying the combination of packet parameters with the highest correlation, mapping the combination of packet parameters to a possible cause, and outputting an indication of the possible cause.

8. The method of claim 1 wherein the graphical user interface allows a user to select regions of the graph of the packet condition and displays ports of the network test device and the device under test and graphical connections between the ports that correspond to the packet condition selected in the graph.

9. A system for assisting with debugging of conditions associated with the processing of test packets by a device under test, the system comprising:
   in a network test device:
      at least one port unit for transmitting test packets to a device under test, receiving at least some of the test packets from the device under test, and for storing information regarding the transmitted packets and the received packets; and
      a graphical user interface that displays a graph of a packet condition and provides a button for triggering investigation of at least one course of the packet condition;
      a packet condition debug assistant configured to, in response to actuation of the button:
         automatically apply rules to the stored information to determine correlations between packet conditions and packet parameters,
         automatically determine at least one possible cause of the packet condition based on the correlations; and
         automatically output an indication of the at least one possible cause of the packet condition.

10. The system of claim 9 wherein the packet condition debug assistant is configured to determine whether the packet condition is associated with a specific port of the device under test.

11. The system of claim 9 wherein the packet condition debug assistant is configured to determine whether the packet condition is associated with a particular packet payload size.

12. The system of claim 9 wherein the packet condition includes packet loss.

13. The system of claim 9 wherein the packet condition comprises packet latency.

14. The system of claim 9 wherein applying rules to the stored information includes applying a plurality of rules to the stored information and determining a correlation between the packet parameters associated with each rule and the packet condition.

15. The system of claim 9 wherein determining at least one possible cause for the packet conditions includes identifying the combination of packet parameters with the highest correlation, mapping the combination of packet parameters to a possible cause, and outputting an indication of the possible cause.

16. The system of claim 9 wherein the graphical user interface allows a user to select regions of the graph of the packet condition and displays ports of the network test device and the device under test and graphical connections between the ports that correspond to the packet condition selected in the graph.

17. A non-transitory computer readable medium having stored thereon executable instructions that when executed by the processor of a computer control the computer to perform steps comprising:
   in a network test device:
      transmitting test packets to a device under test;
      receiving at least some of the test packets from the device under test;
      storing information regarding the transmitted packets and the received packets;
      providing, by the network test device, a graphical user interface that displays a graph of a packet condition;
      providing, by the network test device, a button in the graphical user interface for triggering investigation of at least one cause of the packet condition, and, in response to actuation of the button:
         automatically applying rules to the stored information to determine correlations between packet conditions and packet parameters;
         automatically determining at least one cause of the packet condition based on the correlations; and
         automatically outputting an indication of the at least one cause of the packet condition.

* * * * *